US007226252B2

(12) United States Patent
Glodowski

(10) Patent No.: US 7,226,252 B2
(45) Date of Patent: Jun. 5, 2007

(54) HAND-HELD DRILL LEVERAGE UNIT

(76) Inventor: Mike Glodowski, 1365 Mary La., Meridian, ID (US) 83642

(*) Notice: Subject to any disclaimer, the term of this patent is extended or adjusted under 35 U.S.C. 154(b) by 47 days.

(21) Appl. No.: 11/245,782

(22) Filed: Oct. 6, 2005

(65) Prior Publication Data

US 2007/0081869 A1 Apr. 12, 2007

(51) Int. Cl.
*B23B 45/14* (2006.01)

(52) U.S. Cl. ..................................... 408/1 R; 408/136

(58) Field of Classification Search ................ 408/1 R, 408/111, 136, 712, 99, 87, 95; *B23B 45/14*
See application file for complete search history.

(56) References Cited

U.S. PATENT DOCUMENTS

| | | | | |
|---|---|---|---|---|
| 2,629,267 | A * | 2/1953 | Hart | 408/100 |
| 2,737,065 | A * | 3/1956 | Piersall | 408/99 |
| 2,925,001 | A * | 2/1960 | Johnson | 408/99 |
| 3,068,722 | A * | 12/1962 | Carion | 408/136 |
| 3,387,509 | A | 6/1968 | Lupear | 77/59 |
| 4,197,041 | A | 4/1980 | Prewitt | 408/102 |
| 4,582,456 | A | 4/1986 | Imai | 408/136 |
| 4,634,320 | A * | 1/1987 | Itzov | 408/136 |
| 4,740,119 | A | 4/1988 | Lierz | 408/111 |
| 5,137,235 | A * | 8/1992 | Wentworth et al. | 248/124.1 |
| 5,244,048 | A | 9/1993 | Moorhead, Sr. | 173/141 |
| 5,282,704 | A | 2/1994 | Screen | 408/124 |
| 5,785,467 | A | 7/1998 | Gardner | 408/87 |
| 5,863,158 | A | 1/1999 | Foshee, Jr. et al. | 408/92 |
| 5,885,036 | A | 3/1999 | Wheeler | 408/1 R |
| 5,919,009 | A | 7/1999 | Stephenson | 408/1 R |
| 5,984,594 | A | 11/1999 | Osborne et al. | 408/1 R |
| 6,264,407 | B1 * | 7/2001 | Tinken | 408/136 |
| 6,283,684 | B1 | 9/2001 | Jarvis | 408/103 |
| 6,494,650 | B2 | 12/2002 | Maecker | 408/136 |
| 6,666,282 | B2 | 12/2003 | Merrick | 173/31 |

* cited by examiner

*Primary Examiner*—Daniel W. Howell
(74) *Attorney, Agent, or Firm*—Pedersen & Co., PLLC; Ken J. Pedersen; Barbara S. Pedersen

(57) ABSTRACT

A hand held drill leverage unit for supporting, positioning, and leveraging a drill. The leverage unit has a main lever arm pivotally supported by a fulcrum unit. A drill end of the lever arm supports the drill, while an opposing, longer, handle end of the lever allows manipulation of the lever arm to control the position of, and to leverage, the drill. A user typically grasps the drill handle in one hand, the handle end of the lever arm in the other. Pulling the handle end away from the workpiece forces a leg or foot member of the fulcrum unit against a rear side of the workpiece or of another support member, making the fulcrum unit substantially stationary relative to the workpiece, so that further pulling of the handle end forces the drill end toward the work piece. As the preferred leverage unit need not be fastened or fixed to the workpiece or other support member, the user may quickly and easily move the drill and leverage unit to multiple drilling locations. To remove the drill and leverage unit from each drilling location, the user simply may stop the pulling of the handle end, optionally swing the foot/leg out away from the workpiece, and move the drill and leverage unit away from the workpiece.

13 Claims, 9 Drawing Sheets

HAND-HELD DRILL LEVERAGE UNIT

BACKGROUND OF THE INVENTION

1. Field of the Invention

The present invention relates to hand-held power drills, and more specifically, to a portable leverage unit for supporting and maneuvering a hand-held power drill.

2. Related Art

Issued patents relating to leverage accessories include: Imai (U.S. Pat. No. 4,582,456); Lierz (U.S. Pat. No. 4,740,119); Moorhead, Sr. (U.S. Pat. No. 5,244,048); Screen (U.S. Pat. No. 5,282,704); Gardner (U.S. Pat. No. 5,785,467); Foshee, Jr. et al. (U.S. Pat. No. 5,863,158); Maecker (U.S. Pat. No. 6,494,650); and Merrick (U.S. Pat. No. 6,666,282).

SUMMARY OF THE INVENTION

The present invention relates to hand-held power drills, and more specifically, to a portable leverage unit for supporting and maneuvering a hand-held power tool. The hand-held leverage unit provides additional leverage force upon a power drill bit, when engaging a material to be drilled in order to enable the operator to more easily drill through the material with less fatigue and difficulty.

The leverage unit comprises a fulcrum unit about which the lever arm pivots, said fulcrum unit including a foot/leg system which stabilizes the unit relative to the workpiece by being urged against the workpiece or another support member near the workpiece. The preferred leverage unit comprises adjustment mechanism(s) that make operation more convenient. A foot/leg retraction adjustment may move the stabilizing foot and leg away from the workpiece or other support member to help free the unit for removal. A leg length adjustment may change the length of the leg, to move the pivot point closer to the workpiece and, hence, to adjust the amount of pivot necessary to proceed with drilling at various stages in the drilling process. These adjustments are preferably actuated by controls located at least in part at the effort-end of the lever arm, so that the user may accomplish the adjustments while operating the lever arm and drilling.

DESCRIPTION OF THE PREFERRED EMBODIMENTS

Figure 1:
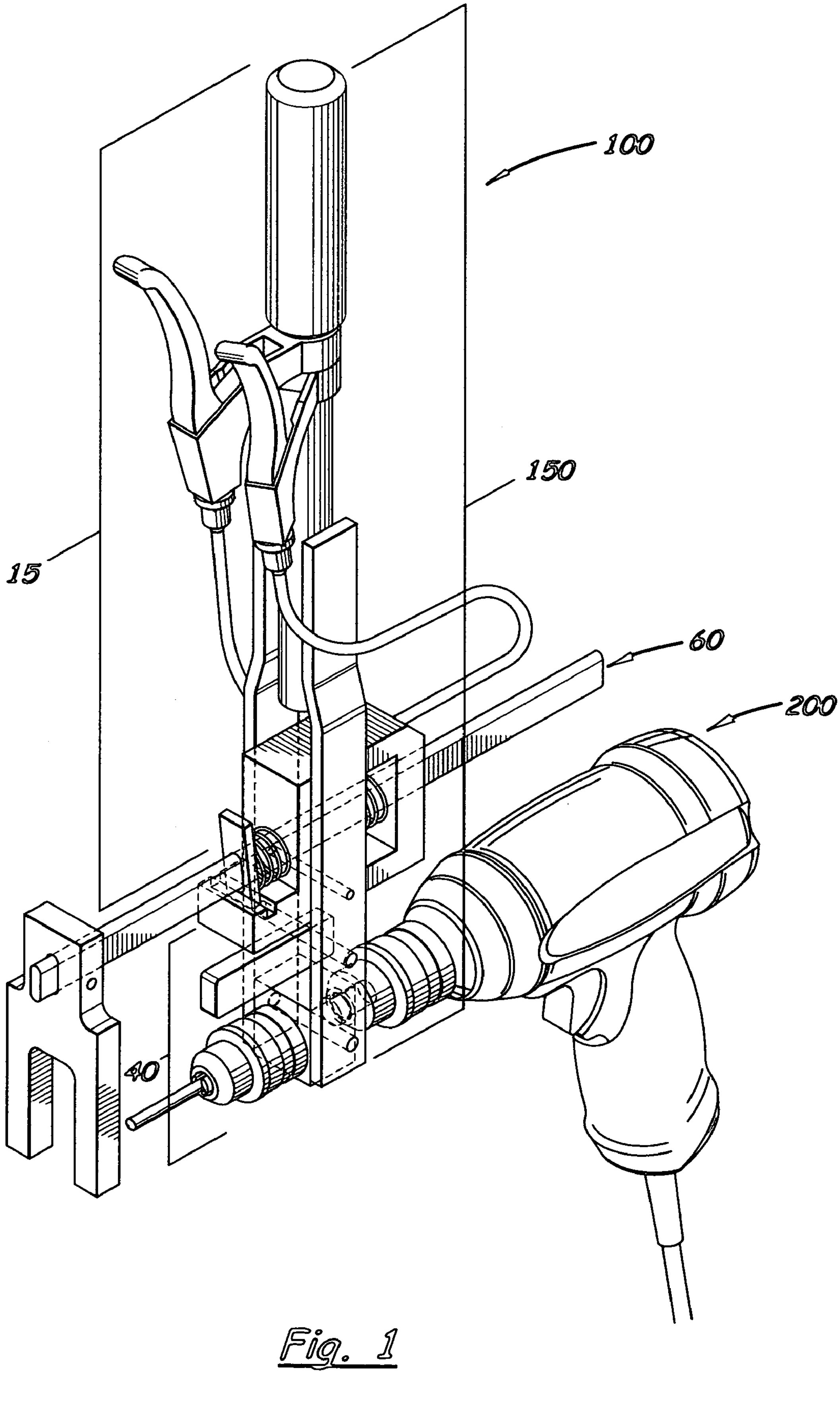
FIG. 1 is a perspective view of one embodiment of the invented hand-held leverage unit.

The preferred leverage unit comprises a main lever arm having a handle portion and a drill portion, a fulcrum unit positioned along the main lever arm between the handle portion and leverage portion. The effort is applied at the handle portion, which moves the main lever arm about the fulcrum unit, in turn urging the drill portion into the material being drilled. Typically, the leverage unit is used to urge the drill into the workpiece as the operator is controlling the power unit to rotate the bit in the direction that drills into the workpiece. The drill portion is adapted to receive a conventional power drill and is preferably freely rotatable, so that the drill is capable of rotating 360 degrees, thus making it easier for the user to drill into objects at many different workpiece orientations and user stances.

The preferred fulcrum unit comprises a fulcrum leg and a fulcrum foot capable of being manually or semiautomatically adjusted by the operator without stopping the drill. Additionally, the fulcrum foot is capable of being held/urged against a member in order to stabilize the leverage unit, and the member need not necessarily be the workpiece; the foot is preferably held/urged against the member due to the effort exerted on the handle portion which creates a force that tends to hold the foot against the member; therefore, the foot creates the counter-force that stabilizes the fulcrum unit, so that the main lever arm can pivot on the fulcrum with the handle is pulled away from the workpiece. The fulcrum unit is preferably adapted so that the leg system is adjustable in length, so that the pivot point of the lever arm may be brought closer to, or farther from, the workpiece as needed in the initial preparations for drilling. Also, this adjustment system may be used later in the drilling process, for example, to move the pivot point closer to the workpiece so that the user may continue to apply effort to the lever arm while the lever arm is in the preferred range of locations, that is about 70–120 degrees to the leg or, more preferably, 80–110 degrees to the leg (that is, within about 10 degrees either way of parallel to the typical workpiece top surface). Further, the preferred fulcrum foot is adjustable in location, by being moved away from the workpiece or other support member, so that the foot is not in the way as the drill is removed from the work piece.

Referring to the Figures, there is shown one, but not the only embodiment of the invented hand-held drill leverage unit, referred to hereinafter as just "leverage unit." As shown in FIGS. 1–7 the preferred leverage unit 100 comprises a main lever arm 150 having a handle portion 15 and a drill portion 40. The preferred lever arm 150 illustrated in the drawings is straight, but alternative lever arms may be curved or bent as desired for fitting into a tight space. A fulcrum unit 60 is positioned between the handle portion 15 and the drill portion 40, so that the main lever arm 150 pivots about the fulcrum unit 60. The effort is applied at the handle portion 15, which moves the main lever arm 150 about the fulcrum unit 60, in turn urging a drill bit 52 on the drill portion 40 into the material being drilled, and optionally also out of the material, depending on which direction the effort is being applied. When the effort is moving the handle portion 15 away from the workpiece W, the drill bit 52 is urged into the workpiece W in order to drill.

The drill portion is adapted to receive a conventional power drill in a chuck adaptor 46, which is preferably freely rotatable, so that the portable leverage unit 100 may be used on a variety of workpieces W, wherein the workpieces W may be oriented differently (for example, vertically versus horizontally oriented). The leverage unit 100 is preferably not fixed to the workpiece W with screws, nails, bolts, or other semipermanent or permanent securement means so that the leverage unit 100 is easily portable, relying solely on force and leverage to be secured while the operator is drilling.

The drill portion 40 comprises a brace 42 for attaching to an elongated shaft 17 of the handle portion 15, a pivotal block 44 at the end of the brace 42 opposite the handle portion 15, and a chuck adaptor 46 rotatably mounted in the block 44, wherein the chuck adaptor 46 comprises a chuck end 48 and a shaft end 50. The chuck end 48 is configured to receive a drill bit 52 and the shaft end 50 is adapted to be received in the chuck end of a power unit, such as a drill 200. The chuck adaptor 46 is preferably freely rotatable in the block 44, so that when the drill 200 is mounted on the shaft end 50 of the chuck adaptor 46, the drill 200 is capable of being rotated 360 degrees; preferably, there is no lock to hold the drill at any particular position in this rotation, as the user's hand on the power unit controls where the power unit and its handle are located within that 360 degrees. The brace 42 may extend along the main body of the lever arm 150 so that it is secured along the handle portion 15. In an alternative embodiment, the shaft 17 of the handle portion 15 and the brace 42 of the drill portion 40 may be manufactured to be one integral lever arm 150.

The handle portion 15 comprises an elongated shaft 17 having a gripping portion 19 at one end and being attached to the brace 42 of the drill portion 40 at the other end. The handle portion 15 is fitted with a pair of actuating members, a foot actuator 20 and a leg actuator 30, for actuating adjustment of the fulcrum unit 60 of the leverage unit 100. The actuating members may be as simple as pair of bicycle brake handles each having a cable, for example. The foot actuator 20 comprises a mount 22 which secures the actuator 20 to the shaft 17, an actuator handle or "clamping member 24": pivotally connected to the mount 22, and a cable 26 that extends from the actuator 20 and is operably connected to the pivot end 78 of a swing arm 74 along the brace 42. The leg actuator 30 comprises a mount 32 which secures the actuator 30 to the shaft 17, a second actuator handle or "clamping member 34" pivotally connected to the mount 32, and a cable 36 that extends from the actuator 30 and is operably connected to the fulcrum unit 60. Operation of these fulcrum unit adjustment mechanisms will be discussed later in this Description.

The fulcrum unit 60 comprises a fulcrum block 62 for receiving and stabilizing a fulcrum leg 64 and a fulcrum foot 66. The fulcrum block 62 is pivotally mounted to main lever arm 150 preferably on the brace 42 nearer the drill portion 40, in a preferred range of locations that create approximately 2- to 10-fold leverage on the drill, that is, a location about ⅓–1/11 of the way along the length of the main lever arm from the distal end of the drill portion 40. The fulcrum leg 64 is slidably received in the fulcrum block 62 and may be adjusted longitudinally in a direction generally perpendicular to the main lever arm 150 using the spring 72 and lever(s) 68, 70 system illustrated in the drawings. The fulcrum foot 66 is fitted to one end of the fulcrum leg 64 and its orientation relative to the leg 64 may be manually adjusted by means of a screw or other adjustment means. The foot 66 may have an aperture 67 so that the drill bit 52 may pass through the aperture 67 when drilling through a workpiece W. Alternatively, the foot may be a single abutment member, a clamp member that can removably attach to a workpiece or other support members, a hook(s), a suction cup(s), or other foot member(s). A swing arm 74 is positioned between the block and chuck adaptor system (44, 46) and the fulcrum unit 60. The swing arm 74 has an abutment end 78 and is pivotally mounted to the brace 42 at its pivot end 76. As will be discussed below, the swing arm 74 moves the leg 64 out of the way when needed.

Figure 2:
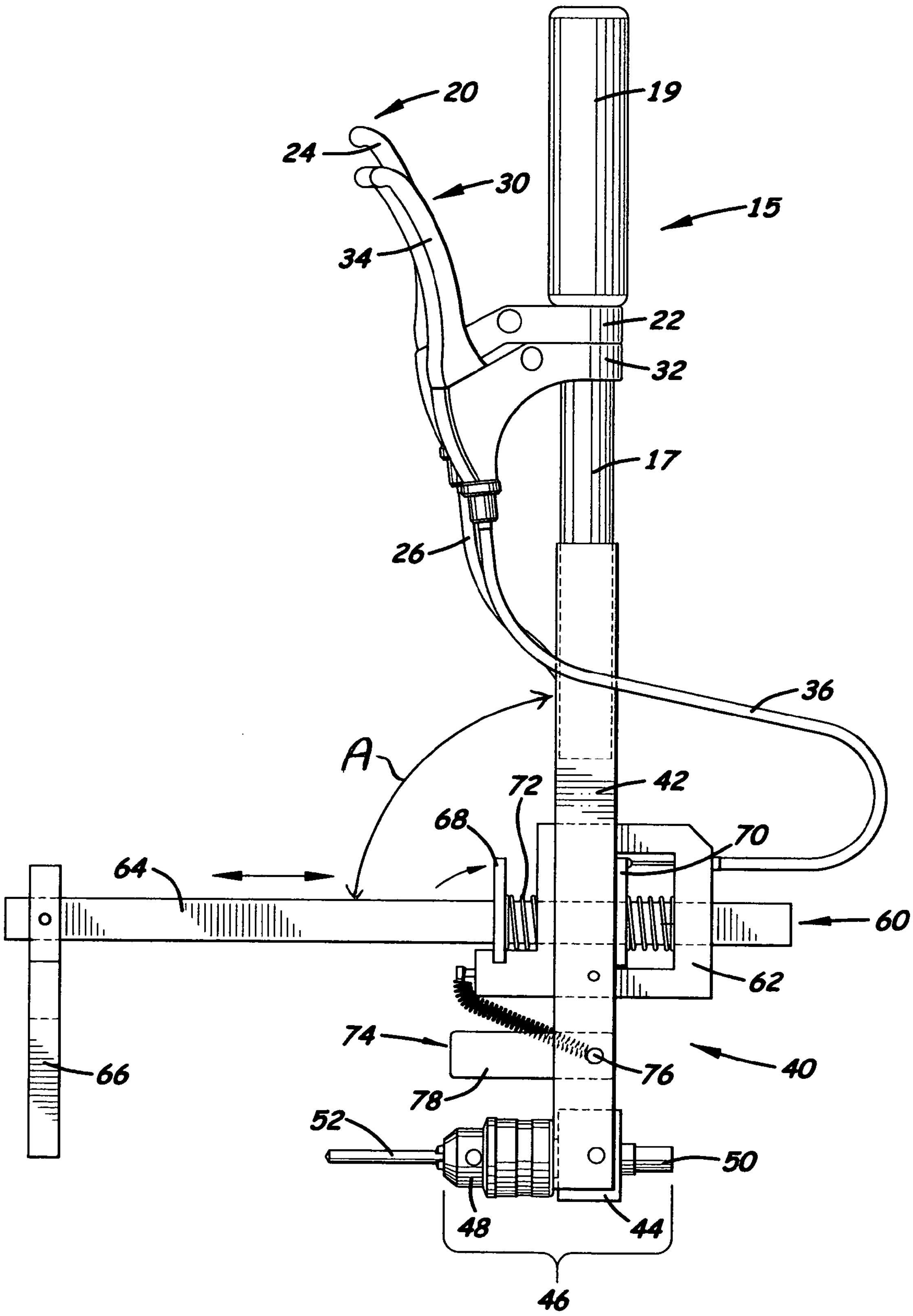
FIG. 2 is a side view of the embodiment shown in FIG. 1, wherein the fulcrum foot and leg are nearly fully extended and wherein the double-ended arrow denotes the directions of longitudinal adjustment of the leg.

As shown in FIG. 2, the fulcrum leg 64, and foot 66, seeing as the foot 66 is attached to the leg 64; may be manually moved longitudinally as indicated by the arrows by pivoting the lever 68 in the direction indicated by the arrow, wherein the grasping of the leg 64 by the lever moves the leg 64 and in turn the foot 66. The lever 68 tends to be oriented at an angle relative to the leg 64, in which orientation the lever 68 frictionally grips the leg, due to biasing by the spring 72. When the operator pushes the lever 68 toward the fulcrum block 62, so that the lever 68 is generally parallel to the surface of the fulcrum block 62 and generally perpendicular to the leg 64 (which compresses the spring 72) the lever 68 releases the leg 64 to allow the operator to manually slide the leg 64 and foot 66 in a longitudinal direction. This permits the operator to adjust the distance between the drill bit 52 and the foot 66 to accommodate different size workpieces W, with the goal being to start the drilling and leveraging in a condition wherein the bit abuts against one surface of the workpiece, the foot abuts against an opposite surface of the workpiece (or a surface of another support member), and the lever arm handle end is slightly below perpendicular to the leg, that is, at about 70–80 degrees from the leg lower end. This manual adjustment may be done prior to drilling in order to minimize the distance the operator must move the handle portion 15 before the drill bit 52 will contact the workpiece W. For example, if the leg 64 and foot 66 were fully extended, and the workpiece W is not very thick, the operator would need to fully elevate the handle portion 15 before the drill bit 52 would contact the surface of the workpiece W. This would place the main lever arm 150 of the leverage unit 100 in a position wherein main lever arm 150 could not really be raised anymore. After the length adjustment has been made, the spring 72 will tend to push the lever 68 back to a position at an angle relative to the leg 64, in which the lever 68 again frictionally engages the leg to "lock" the leg 64 in the newly adjusted position. In the newly-adjusted position, the leg 64 is shortened to an extent that the drill bit 52 contacts the workpiece W and the main lever arm 150 is in a position (like in FIG. 1) from which the main lever arm 150 can be pivoted in the preferred range of angle A to effectively leverage the drill 200. Said preferred range of angle A constitutes the user starting with the handle end at about 70 degrees (more preferably 80 degrees), and pivoting the lever arm up to about 120 degrees, (more preferably 110 degrees).

Alternatively, or additionally, the leg 64 and foot 66 may be adjusted semiautomatically while drilling by means of the leg actuator 30. See FIG. 3. While drilling, the operator may realize that he needs to shorten the distance between the drill bit 52 and the foot 66, in order to reposition the lever arm 150 relative to the workpiece W for effective pivoting of the main lever arm 150 in the preferred range of angle A. While the operator holds the drill 200 in one hand, he can hold the handle portion 40, and press on the clamping member 34 in the direction indicated by the arrow, with the other hand. This pressing of clamping member 34 will cause the cable 36 to tighten, in turn moving the lever 70 in the direction indicated by the arrow to pull the orientation of the lever 70 from a position generally parallel to the surface of the block 62 and perpendicular to the leg 30 to an engaging position at an angle relative to both the leg 30 and the block 62. In this engaging position, the lever frictionally engages the leg 30 and pulls the leg 30 with it a small distance toward the right of FIG. 3, in turn shortening the distance between the foot 66 and the drill bit 52. Once the clamping member 34 is released, the spring 72 tends to force the lever 70 back to a position perpendicular to the leg 64 in turn "locking" the leg 64 in the adjusted position. Repeated use of the clamping member 34 will "ratchet" the leg 64 to the right of the page in FIG. 3. While the preferred system is not a toothed ratchet system, in that the leg is preferably smooth and untoothed, the term "ratchet" is used herein to indicate the incremental grasping and pulling of the leg by repeated actuation of the clamping member 34 and, consequently, the lever 70. Other means besides the spring and lever ratchet system may be used to adjust the relative distance between the leg 64 and the drill bit 52, as will be understood by one of skill in the art after reading this Description and viewing the drawings.

If the above-described ways of adjusting the leg system (to keep the lever arm in the preferred range of locations (angle A) and to keep the drill bit 52 nearly perpendicular to the workpiece W) are not optimum or comfortable for the user, another way of adjusting the lever unit may be used, especially for workpieces that are thick or that require great drilling precision. As the drill portion 40 of the leverage unit 100 is pivoted toward the workpiece, the drill bit 52 may tend to move into a non-90 degree angle relative to the workpiece W, especially if the user pivots the lever arm handle end above the preferred range for angle A. This is because pivoting of the main lever arm 150 causes the distal end of the drill portion 40 (and chuck adaptor 46) to swing in an arc towards the leg. Thus, while the drill bit is drilling into the workpiece, this swinging will tend to tilt the bit top end toward the leg, moving the bit into a non-90 degree angle to the workpiece (slanting toward the top right corner and bottom left corner of the page in FIG. 3). To compensate for this, the user may adjust the leg length as discussed above, and/or the operator can adjust the leverage unit 100 by "tilting" the entire leverage unit 100 slightly so that the top end of the drill bit 52 is pushed slightly toward the bottom of the page in FIG. 4A and the bit 52 remains nearly perpendicular to the workpiece W. Thus, as shown in FIG. 4A, the operator may tilt the whole device 100 slightly to keep the drill bit 52 perpendicular to the workpiece W. If the operator pushes the leverage unit 100 a fraction of an inch in the direction indicator by the arrow in FIG. 4A, the foot 66 will tend to move slightly away from the surface of the workpiece W and the leverage unit 100 will tend to pivot at point P just enough to keep the drill bit 52 straight. Thus, it should be noted that it is not required that the foot 66 stay against the workpiece or other support member, and instead only a portion of the foot 66, or a portion of the leg 64 may abut against the workpiece or support member. Alternatively, other mechanisms for keeping the bit generally straight may be used, such as an adjustment of the pivot point of the chucks adaptor relative to the length of the drill portion 40. Leg length adjustment and the optional tilting procedure may not be necessary, especially for thin workpieces or for drilling holes wherein a perfectly straight hole is not required.

Figure 4A:
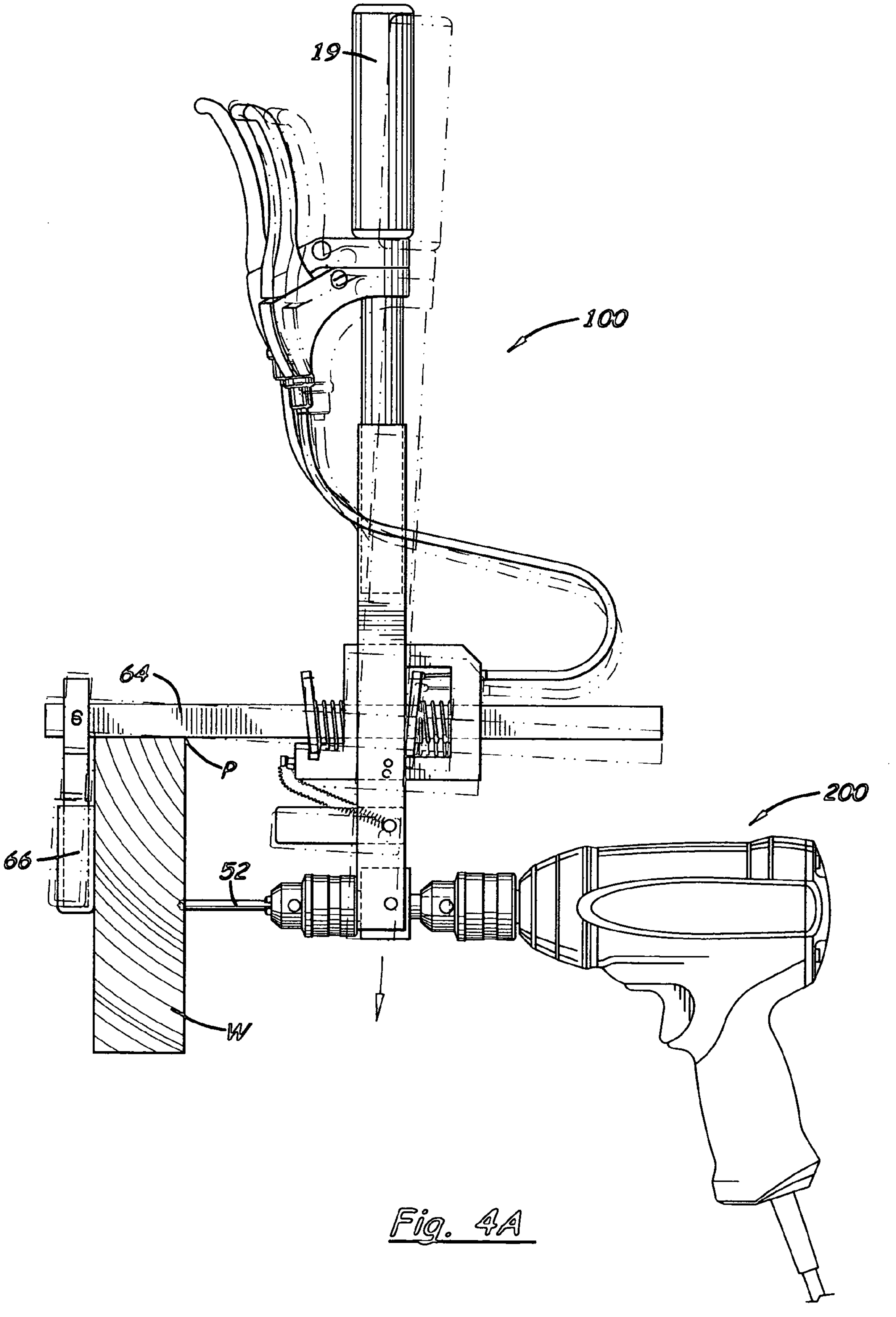
FIG. 4A is a side view of the embodiment shown in FIGS. 1–3, illustrating how the leverage unit may be slightly tilted, if necessary, to maintain the drill bit generally perpendicular to the workpiece as it drills into the workpiece.
Figure 4B:
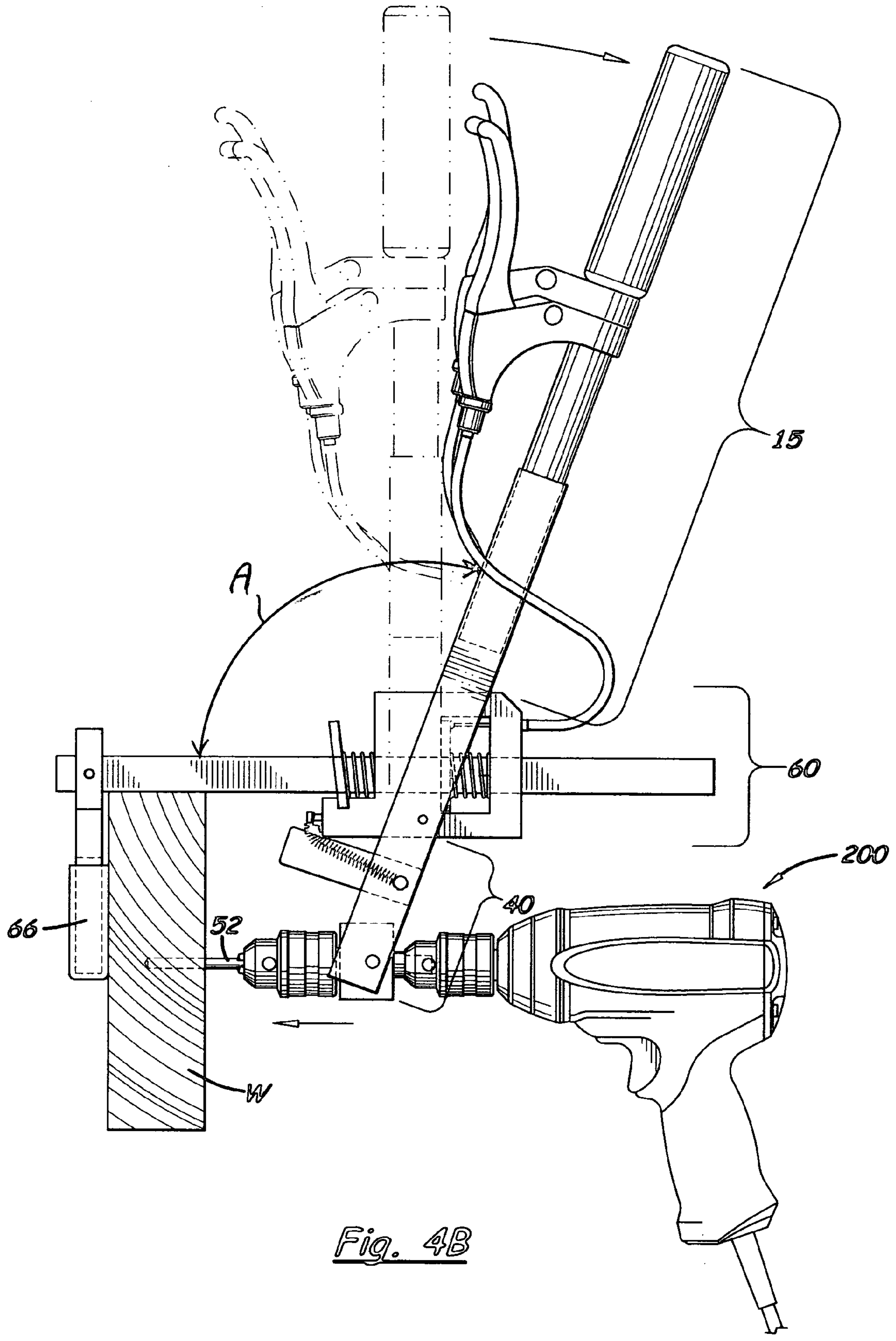
FIG. 4B is a side view of the embodiment shown in FIGS. 1–4A, wherein the handle portion is illustrated being pulled away from the workpiece, assisting the drill bit to drill into the workpiece.

As shown in FIG. 4B, the raising of the handle portion 15 forces the drill bit 52 to drill into the work piece W. The main lever arm 150 (handle portion 15 and drill portion 40) pivot about the fulcrum unit 60, so that the handle portion 15 tends to move away from the workpiece W, as indicated by the arrow, while the drill portion 40 tends to move toward the workpiece W as indicated by the arrow. In the preferred embodiment, the length of the handle portion 15 is 15.75 inches and the length of the drill portion 40 is 3.5 inches for a total length of 19.25 inches. The effort exerted on the handle portion 15 is 4.5 times as far from the fulcrum unit 60 as the weight of the drill 200; therefore, only 0.22 times the amount of effort, or approximately one fourth the amount of effort, is needed to drill the drill bit 52 into the workpiece W. The preferred ratio between the length of the handle portion 15 relative to the drill portion 40 is in the range of about 2:1 up to 10:1, and more preferably about 3:1 up to about 6:1, so that the operator need only exert a small amount of effort compared to drilling into the workpiece W without the unit 100. This can be extremely helpful for difficult-to-drill workpieces, or when a user must drill many holes.

Figure 3:
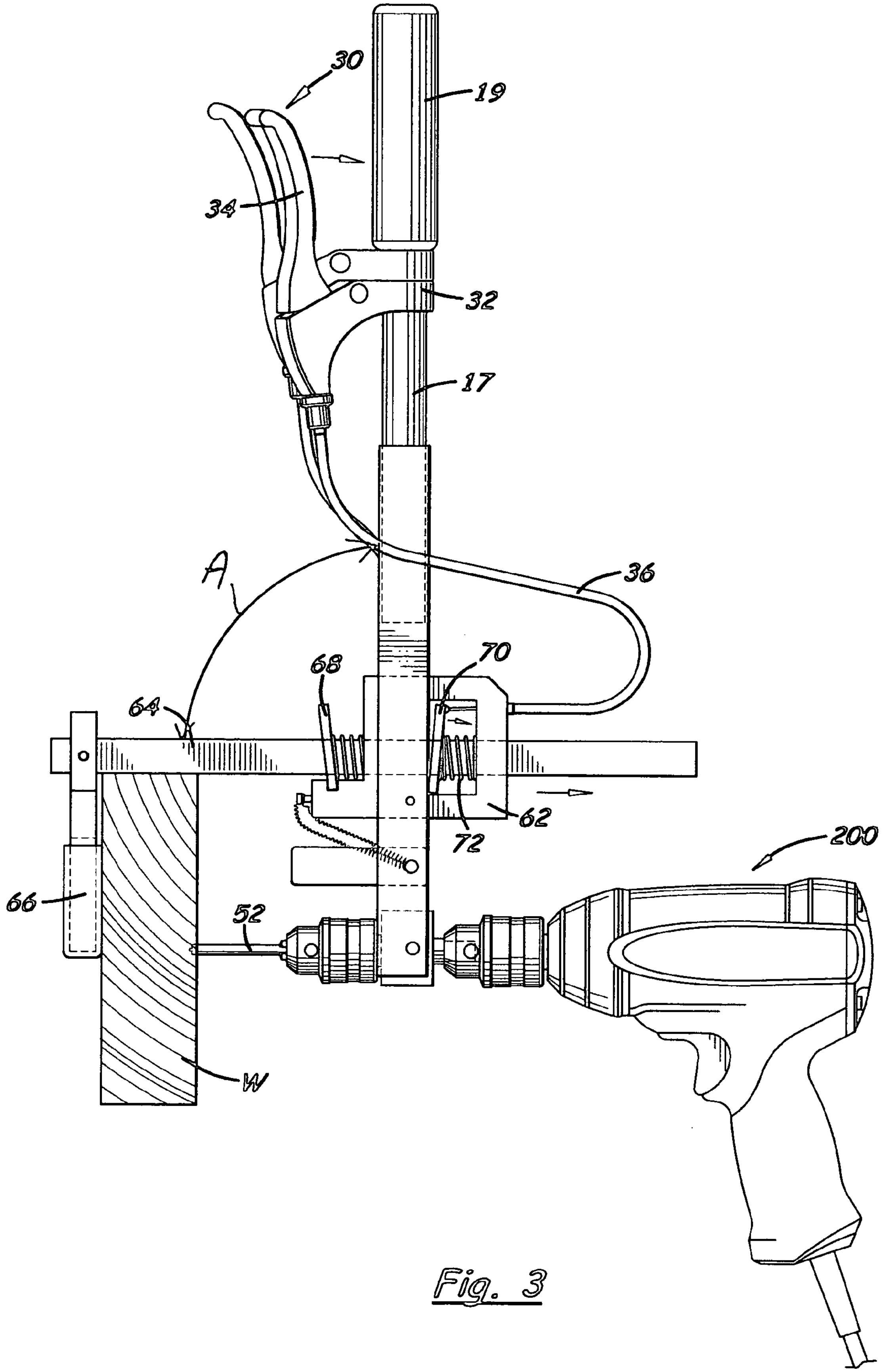
FIG. 3 is a side view of the embodiment shown in FIGS. 1 and 2, wherein the fulcrum foot is positioned around a workpiece and length of the fulcrum leg is being shortened by means of an adjustment mechanism.

In use, as illustrated in FIGS. 3 and 4B, the leverage unit 100 is positioned with the foot 66 against a rear surface of the workpiece W, the drill bit 52 is positioned on or near the front surface of the workpiece W, and the handle portion 15 is pulled. This effort on the handle portion 15 first will urge the foot firmly against the rear surface of the workpiece W. Then, with the foot and fulcrum unit "secured" in this way, further pulling of the handle portion 15 will force the drill portion 40, i.e. drill bit 52, against the workpiece, and, upon rotation of the drill bit 52 in the appropriate position by the drill, the drill bit 52 will drill into the workpiece. The foot 66 does not need to be anchored to the workpiece W by any fasteners, clamps, magnets, or attachments, as the net effect of the forces in this operation will keep the foot 66 against the workpiece W, in effect, "securing" the foot against the workpiece W. During this operation, the user will typically maintain one hand on the handle portion 40 and the other hand on the power unit of the drill, pulling on the handle portion and pushing on the power unit, with the result being effective and quick drilling of the workpiece W with greatly reduced effort.

Figure 5:
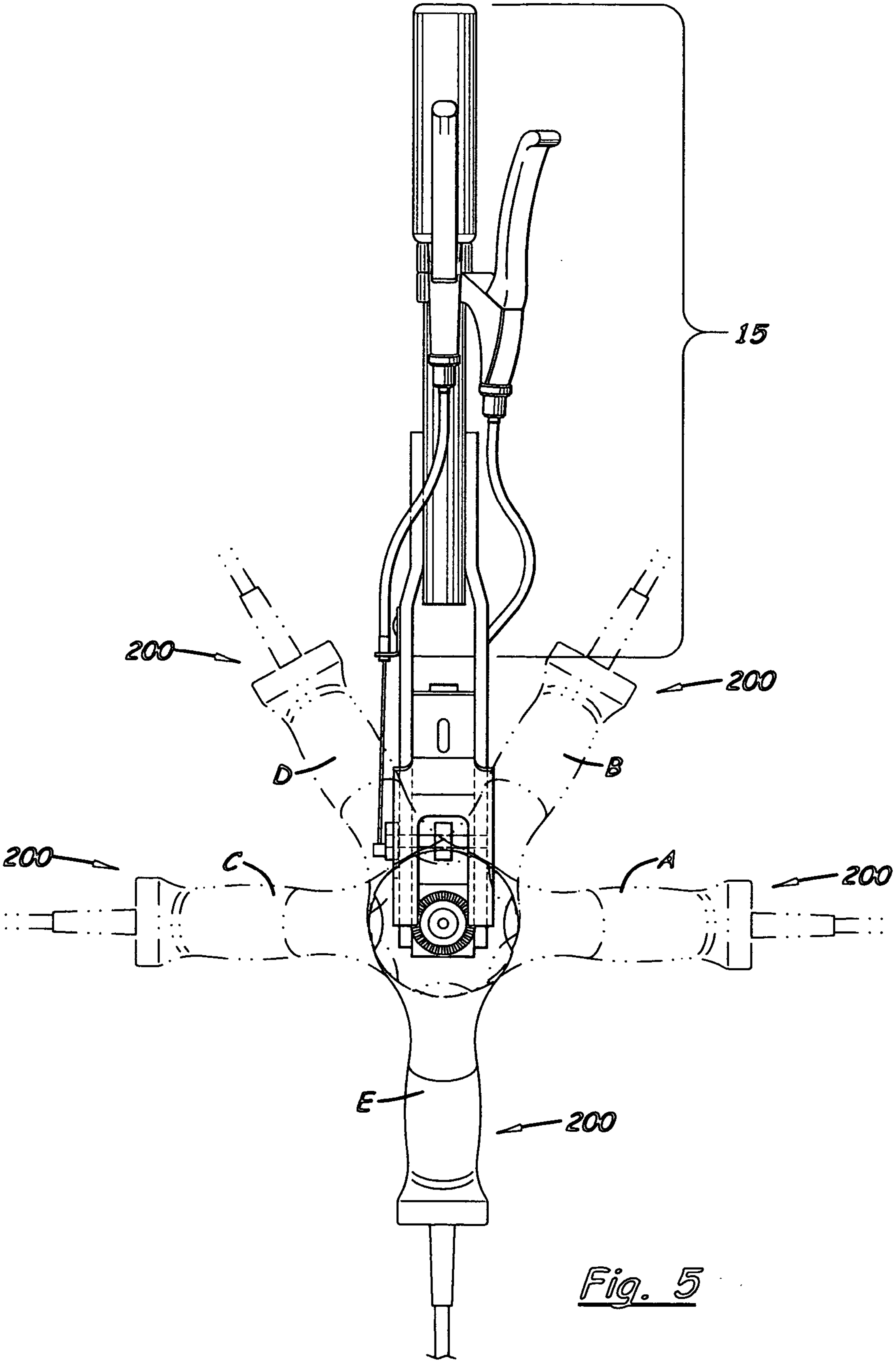
FIG. 5 is a plan view of the embodiment shown in FIGS. 1–4B, wherein the 360 degree rotation of the drill is illustrated.

In the preferred embodiment, the drill portion 40 carries the drill and bit by means of the drill chuck on the drill 200 being fitted to the shaft end 50 of the chuck adaptor 46, and the drill bit 52 being fitted to the chuck end 48 of the chuck adaptor 46. Alternatively, a chuck may be integrally or removably connected to the main lever arm 150 without the intermediate chuck adaptor 46. As the drill chuck rotates, the chuck adaptor 46 rotates as well, due to being rotatably received in the block 44, which, in turn, rotates the drill bit 52. As shown in FIG. 5, the drill 200 fitted on the chuck adaptor 46 is capable of being freely rotated 360 degrees relative to the block 44. This feature permits the operator to manipulate the position of the drill 200 relative to the workpiece W and handle portion, so that the drill 200 is in the most comfortable and operable position. For example, as shown in FIG. 7, if the operator is drilling into the side of the wall, it may be desirable to hold the handle portion 15 with the operator's right hand and hold the handle of the drill 200 with the left hand. It is awkward to hold the drill 200 so that the drill handle is parallel to the wall studs, further, it may be impossible to hold the drill 200 in that orientation as the handle of the drill 200 may abut against the leg 64 of the fulcrum unit 60. Therefore, the operator has the option of rotating the drill 200, to either position A or B, as shown in FIG. 5, or positions there between, so that the drill 200 does not abut against the leverage unit 100 and it is easier to hold the drill 200 while drilling. Alternatively, the operator may hold the handle portion 15 with his left hand and hold the handle of the drill 200 with his right hand. The operator may then rotate the drill 200 to be in either position C or D, as shown in FIG. 5, or positions there between. The drill 200 may even be rotated to position E in FIG. 5, in which the handle of the drill 200 extends 180 degrees away from the main lever arm 150. These are not the only positions the drill 200 may be rotated to, because the preferred unit allows the drill to freely move, preferably without unlatching or unlocking any mechanism, continuously 360 degrees around the end of the lever arm.

Figure 6:
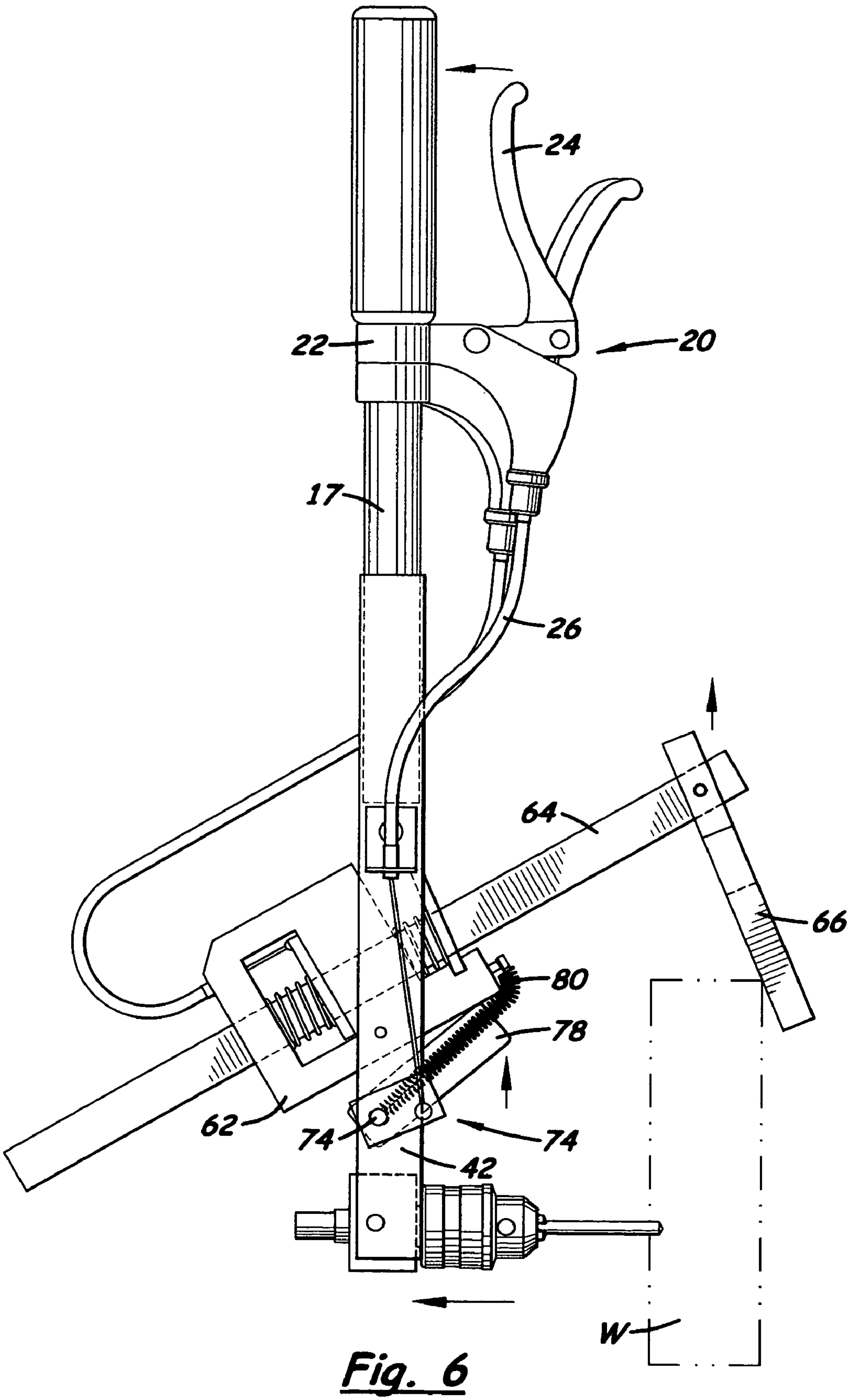
FIG. 6 is a side view of the embodiment shown in FIGS. 1–5, wherein the fulcrum foot has been moved away from the drill bit and the workpiece by means of an adjustment mechanism.

As shown in FIG. 6, when the operator is finished drilling and wants to remove the drill bit 52 from the workpiece W, it may be desirable to move the fulcrum foot 66 away from the workpiece W. When the user pulls the drill/power unit away from the workpiece, the fulcrum foot 66 may tend to resist the movement of the drill bit 52 out of the workpiece W unless the user first pivots the lever arm 150 in reverse, that is, so that the handle portion 40 moves toward the workpiece. The user may find this to be a clumsy task, so it may be easier to simply move the fulcrum foot 66 out of the way of the workpiece in order to more easily pull drill bit 52 from the workpiece W and move the unit 100 to another location. Therefore, the preferred embodiment is designed so that the user may move the foot 66 away from the workpiece W semiautomatically by means of the foot actuator 20. While the operator holds the drill 200 in one hand, he continues to hold the handle portion in the other hand and presses on the clamping member 24 in the direction indicated by the arrow. This will cause the cable 26 to tighten, in turn moving the swing arm 74 in the direction indicated by the arrow, forcing the abutment end 78 of the swing arm 74 against the fulcrum block 62, which will move the fulcrum leg 64 and foot 66 (due to the foot 66 being attached to the leg 64) away from the workpiece W as indicated by the arrow. Once the clamping member 24 is released, the spring 80 will tend to force the swing arm 74 back to its original position, which is generally perpendicular to the brace 42. The preferred swing arm 74 is positioned between the block 44 and chuck adaptor 46 system and the fulcrum block 62. Other means besides springs and lever arms may be used to move the fulcrum foot 66 away from the workpiece W, as will be apparent to one of skill in the art after reading this Description and viewing the drawings. Also, as will be apparent to one of skill in the art, "clamping members" 24 and 34 are only one example of different actuator handles or grips that may be used on the handle portion 40, so that a user may simultaneously grasp the handle portion and actuate/control the fulcrum adjustments with the same hand. Also, the clamping members or other actuator/control grips are preferably positioned closely adjacent to each other generally about 20–45 degrees from each other on the handle but at about the same axial location along the handle.

The preferred leverage unit 100 is adapted to be portable so that it may be used with a variety of different workpieces W; for example, the leverage unit 100 may be used to drill into a vehicle frame or other member, wall, a beam, a desk, a table, flooring, furniture, buildings, or other workpieces W. The foot 66 of the leverage unit 100 is preferably not secured to any surface by means of bolts, screws, nails, or other securement structures. The foot 66 may be manually reversed by removing the foot 66 from the leg 64 so that the foot 66 points away from the drill 200 (see FIG. 7). The foot 66 may also be fitted with a covering to help the foot 66 grip various surfaces; the covering may be rubber or other gripping material.

Figure 7A:
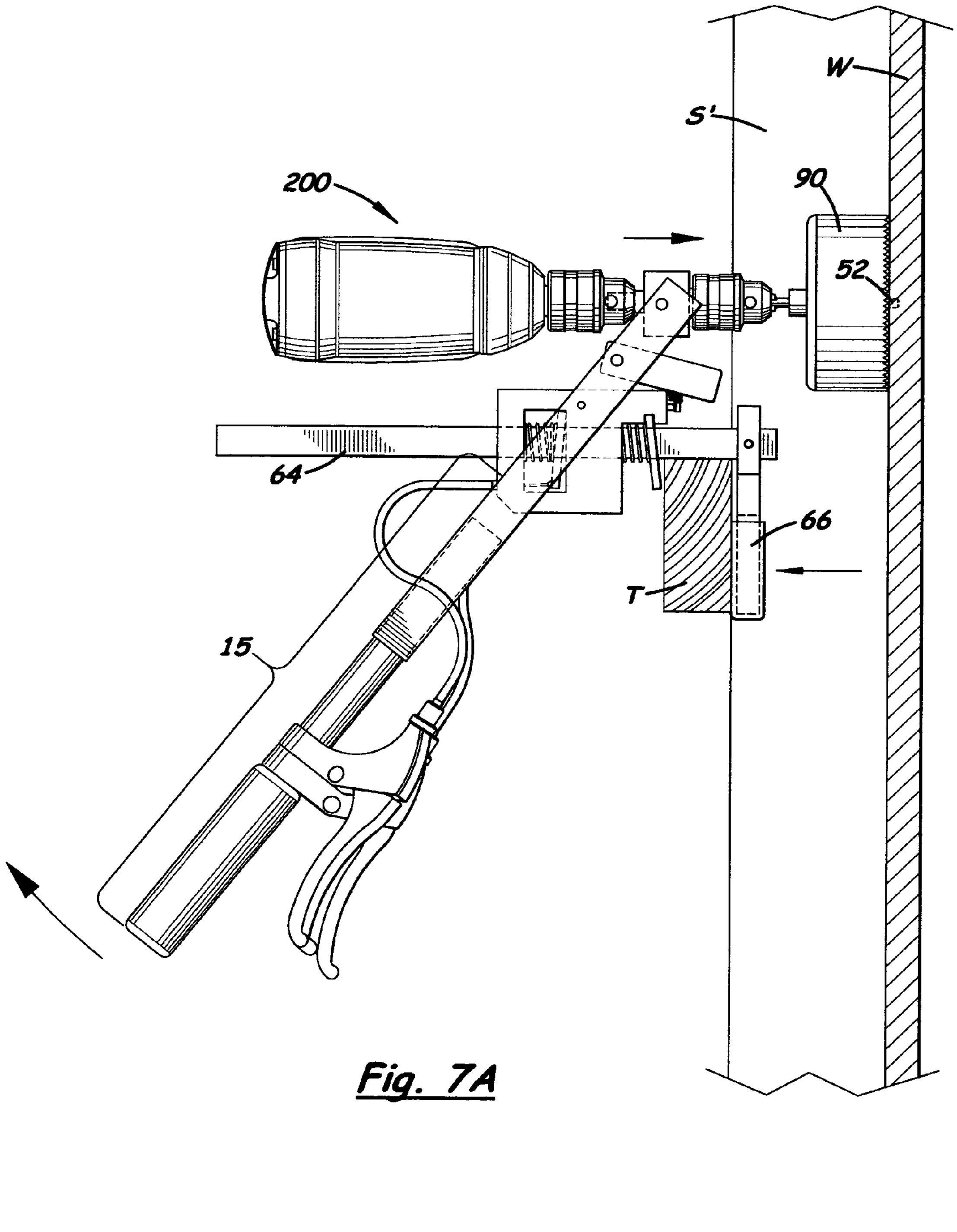
FIG. 7A is a side view of the embodiment shown in FIGS. 1–6, wherein the fulcrum foot is shown positioned against a member other than the workpiece.
Figure 7B:
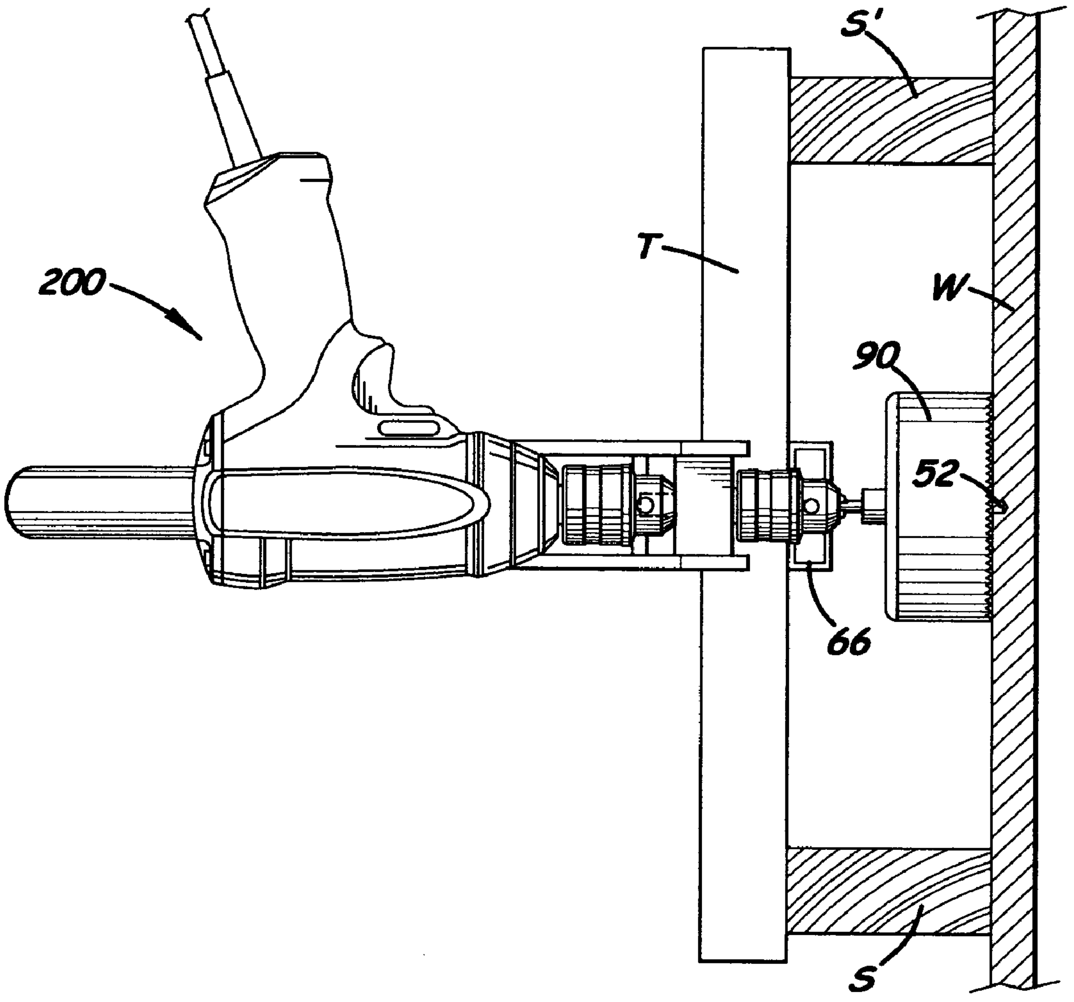
FIG. 7B is a top view of the embodiment shown in FIG. 7A.

Additionally, the foot 66 need not be secured to the workpiece W through which the drill 200 is drilling. For example, as illustrated in FIGS. 7A and 7B, the fulcrum foot 66 is urged against a temporary board T while the drill 200 is drilling into the workpiece W. In this example, the operator is using a hole saw style drill bit 90, 52 to drill a hole in an oriented strand board (OSB) for plumbing, vents such as a dryer vent, or electrical purposes such as an electrical conduit, for example. The OSB is the workpiece W through which the hole saw drill bit 90, 52 will drill. The hole will be drilled between spaced apart studs S, S' oriented perpendicularly to the workpiece W, but distanced from the workpiece W, in fact, "in front" of the workpiece W rather than "behind" the workpiece W. Due to the large nature of the workpiece W there is no place for the foot 66 to be placed on the workpiece W; therefore, a temporary board T is nailed to the two studs S, S', and the foot 66 is then "hooked" over the board T, so that the leg 64 of the fulcrum unit 60 is perpendicular to the workpiece W and the foot 66 is parallel to but not touching the workpiece W. The operator then pulls the handle portion 15 away from the workpiece W, as indicated by the arrow, which forces the hole saw bit 90, 52 into the workpiece W. The foot 66 is thus urged against the board T, securing the fulcrum unit, so that operation of the main lever arm 150 urges the drill bit 52 into the workpiece W.

Alternatively, the fulcrum unit 60 may be stabilized/secured by means other than being urged against the rear side of a workpiece or support member. For example, the fulcrum unit may be secured to a workpiece or a support member near the workpiece by means of a suction cup system. One or more suction cups may extend from the fulcrum unit, for example, from the leg or from a foot member, for suction-connection to the front/top surface of the workpiece or of a support member adjacent the workpiece. As in the preferred embodiment, the leg and/or foot member and the suctions cup(s) would be designed to be out of the way of the drill bit during operation. Such a system that mounts to the top/front surface of a workpiece or adjacent object, as opposed to a "rear-mount" system that urges a foot against the rear of the workpiece or support member, would be effective for very large items to which a temporary support member (such as temporary board T) is not easily or safely connected, for example, an airplane wing needing drilling of multiple rivets.

The invented unit may, in some embodiments, be described as consisting only of a lever arm, a fulcrum unit adapted for bracing against a support object or member such as (but limited to) the workpiece, wherein one end of the lever arm is configured to carry a drill and the other end is configured to pivot the lever arm on the fulcrum unit. "Bracing" of the fulcrum unit against the support object or member means that the fulcrum is not fastened, not attached, to the support object or member, but urged or pressed against it and, therefore, upon release of the urging or pressing, easily removable. Therefore, the preferred embodiments of the leverage unit need not include a frame, stand, or other complex and heavy structure as might be needed for a standing, stationary drill press. Further, it is preferred that bracing not include biting, gouging, or otherwise entering the workpiece or support object/member, but only pressing against or at most friction- or suction-gripping in a non-intrusive and non-damaging manner.

Although this invention has been described above with reference to particular means, materials and embodiments, it is to be understood that the invention is not limited to these disclosed particulars, but extends instead to all equivalents within the scope of the following claims.

I claim:

1. A portable leverage unit comprising:

a lever arm having a drill portion and a handle portion, the drill portion configured to receive a power unit;

a fulcrum unit pivotally connected to the lever arm between the handle portion and the drill portion, wherein the fulcrum unit comprises a leg system having a fulcrum leg and a fulcrum foot, and the fulcrum foot is adapted to secure the fulcrum unit against a support member; and a leg adjustment mechanism configured to move the foot farther from the lever arm and closer to the lever arm, the leg adjustment mechanism comprising a first actuation control on the handle portion of the lever arm so that a user operates the leg adjustment mechanism with a hand grasping the handle portion.

2. A portable leverage unit as in claim 1, wherein the power unit is a hand-held power drill rotatably received in said drill portion, wherein the drill may be rotated 360 degrees around the drill portion.

3. A portable leverage unit as in claim 1, wherein the drill portion comprises a chuck adaptor having a shaft end for receiving a drill chuck and a chuck end for receiving a drill bit, and wherein said chuck adaptor is freely rotatable relative to the lever arm.

4. A portable leverage unit as in claim 1, wherein the leg adjustment mechanism is further configured to swing the leg system in a plane parallel to the lever arm, to move the leg system away from a workpiece, and wherein the leg adjustment mechanism further comprises a second actuator control for swinging the leg system, and wherein the second actuator control is located on the handle end.

5. A portable leverage unit as in claim 1, wherein said fulcrum foot is not secured to said support member with bolts, screws, nails or other semipermanent or permanent securement structures.

6. A portable leverage unit as in claim 1, wherein the length of the handle portion relative to the drill portion is in a ratio in the range of 2:1 to 10:1.

7. A portable leverage unit as in claim 1, wherein the fulcrum unit comprises a block and wherein said leg slidably extending through the block, the leg adjustment mechanism comprising a engaging lever that engages the leg, when the first actuator control is operated, to pull the leg longitudinally in the block.

8. A portable leverage unit as in claim 4, wherein the leg adjustment mechanism for swinging the leg system comprises a swing lever pivotally mounted to the lever arm, the swing lever having a distal abutment end that abuts against the leg, when the second actuator control is operated, to push the leg to swing.

9. A drill leverage system comprising:

a leverage unit; and a support member against which the leverage unit is braced;

wherein the leverage unit comprises:

a lever arm having a drill portion and a handle portion, the drill portion configured to receive a power unit;

a fulcrum unit pivotally connected to the lever arm between the handle portion and the drill portion, wherein the fulcrum unit comprises a leg system having a fulcrum leg and a fulcrum foot, and the fulcrum foot presses against the support member to secure the fulcrum unit against a support member; and a leg adjustment mechanism configured to move said leg relative to the lever arm and having a first actuation control on the handle portion of the lever arm so that a user operates the leg adjustment mechanism with a hand grasping the handle portion; and wherein the foot is not fastened or fixed to the support member.

10. A method for drilling a workpiece comprising:

a leverage unit having a lever arm comprising a handle portion and a drill portion, and the leverage unit further comprising a fulcrum unit between said handle portion and said drill portion, wherein said lever arm pivots about the fulcrum unit, and a drill is rotatably received in the drill portion;

applying effort to said handle portion in a first direction away from the workpiece which moves said drill portion and drill toward the workpiece, wherein said effort applied to the handle portion also forces a foot of the fulcrum unit against a rear side of a support member; and adjusting the distance of the foot from the lever arm by actuating a control on the handle end with the same hand that is applying effort to said handle portion.

11. A method for drilling a workpiece as in claim 10, wherein said adjusting of the distance of the foot comprises moving a leg holding the foot longitudinally toward and away from said lever arm.

12. A method for drilling a workpiece as in claim 11, said first actuator is actuated to move the leg longitudinally so that various sized support members are received between the foot and the drill.

13. A method as in claim 12, further comprising using a second actuator on said handle portion to swing the foot and leg away from said support member.

* * * * *